United States Patent [19]

Vykukal

[11] Patent Number: 4,593,415

[45] Date of Patent: Jun. 10, 1986

[54] TORSO SIZING RING CONSTRUCTION FOR HARD SPACE SUIT

[75] Inventor: Hubert C. Vykukal, Los Altos, Calif.

[73] Assignee: The United States of America as represented by the Administrator of the National Aeronautics and Space Administration, Washington, D.C.

[21] Appl. No.: 684,193

[22] Filed: Dec. 20, 1984

[51] Int. Cl.$^4$ ................ A62B 17/00; F16L 11/18
[52] U.S. Cl. ..................... 2/2.1 A; 414/7; 285/168; 138/120
[58] Field of Search .................. 2/2.1 A, 2.1 R; 128/202.11; 414/1, 5, 7, 8; 285/168, 179, 181, 182, 184, 227, 235, 177, 11, 263, 264, 261, 166; 3/12, 12.1–12.8; 138/120, 155

[56] References Cited

U.S. PATENT DOCUMENTS

| | | | |
|---|---|---|---|
| 3,534,406 | 10/1970 | Barthlome | 2/2.1 A |
| 3,636,564 | 1/1972 | Vykukal | 2/2.1 A |
| 4,369,814 | 1/1983 | Humphrey | 2/2.1 R |

FOREIGN PATENT DOCUMENTS 8297  1/1979  Japan ................. 2/2.1 A

Primary Examiner—Werner H. Schroeder
Assistant Examiner—Andrew M. Falik
Attorney, Agent, or Firm—Darrell G. Brekke; John R. Manning; Robert D. Marchant

[57] ABSTRACT

A hard suit for use in space or diving applications having an adjustable length torso covering that will fit a large variety of wearers. The torso covering comprises an upper section and a lower section which interconnect so that the covering will fit wearers with short torsos. One or more sizing rings may be inserted between the upper and lower sections to accommodate larger torso sizes as required. Since access of the astronaut to the torso covering is preferably through an opening in the back of the upper section (which is closed off by the backpack), the rings slant upward-forward from the lower edge of the opening. The lower edge of the upper covering section has a coupler which slants upward-forward from the lower edge of the back opening. The lower torso section has a similarly slanted coupler which may interfit with the upper section coupler to accommodate the smallest torso size. One or more sizing rings may be inserted between the coupler sections of the upper and lower torso sections to accommodate larger torsos. Each ring has an upper coupler which may interfit with the upper section coupler and a lower coupler which may interfit with the lower section coupler.

10 Claims, 6 Drawing Figures

TORSO SIZING RING CONSTRUCTION FOR HARD SPACE SUIT

ORIGIN OF THE INVENTION

The invention described herein was made by an employee of the United States Government and may be manufactured and used by and for the Government for governmental purposes without the payment of any royalties thereon or therefor.

BACKGROUND OF THE INVENTION

1. Field of the Invention

This invention relates to hard space suits, and more particularly, relates to the torso portion of such a suit. It may also be used on diving suits and in other environments which require protection of the wearer from external hostile elements. The torso portion has a joint between its upper and lower portions to receive one or more sizing rings so that the torso portion may be lengthened to accommodate a wide range of wearer sizes.

2. Description of the Prior Art

U.S. Pat. No. 3,139,622 reveals a pressurized capsule for protecting a moon walker who is wearing a pressurized suit. The capsule has a rear door and supports an umbrella-shaped reflector for reflecting solar radiation. No apparatus is disclosed for adjusting the torso dimensions of either the capsule or the suit.

U.S. Pat. Nos. 3,405,406 and 4,091,464 each disclose a substantially constant-volume space suit in which the torso breaks apart into an upper section and a lower section. The sections must be separated in order for the wearer to extricate himself from the suit. The torso section of each suit is articulated. In U.S. Pat. No. 3,405,406 the torso joint utilizes bellows whereas in U.S. Pat. No. 4,091,464 the torso joints are of the rolling convolute variety. In the present invention the torso covering is not articulated and wearer ingress and egress is achieved by means of a rear opening that is covered with a backpack when the suit is pressurized. The suits described in the two patents have no apparatus to alter the dimensions of the torso portion so that it may accommodate users of different size. In contradistinction, the present invention permits the torso portion of a space suit to be quickly shortened or lengthened so that it will fit a variety of users.

Although it is known to employ replaceable annuli of different sizes in leg and arm coverings of a suit, heretofore sizing rings have not been used to increase the vertical dimension of the torso portion of a space suit.

OBJECT OF THE INVENTION

Astronauts vary greatly in height and also in torso length (the difference between acromial height and crotch height). Heretofore it has been necessary to fabricate space suits with a variety of torso portion sizes to accommodate the many sizes of astronauts. This fabrication process is costly. On space missions wherein only one astronaut has to engage in extra-vehicular activities at any given time, it would obviously save payload space if only one suit had to be carried aboard and this suit could be quickly made to fit each astronaut. In an article appearing on page 35 of the Sept. 26, 1984 issue of *The Wall Street Journal* staff reporter Kathleen A. Hughes discussed NASA's problems in obtaining space suits to fit very small astronauts. The article points out that there is presently no suit available to enable one 5-foot 2-inch, 100 pound astronaut to engage in extra-vehicular activities. It was estimated that a new small suit for this astronaut would cost approximately $500,000. It is a primary object of the invention to provide a space suit with an adjustable length torso portion that may be economically fabricated and quickly adjusted to fit a large variety of wearers. In accordance with the present invention, sizing rings are inserted between the upper and lower torso sections to increase the torso length. The space suit of the present invention can easily be made to cover the range from the five percentile female to the 97 percentile male torso lengths as given in NASA Reference Publication 1024, Anthropometric Source Book, Three Volumes, 1978. This range is not a limit, it merely represents one embodiment made in accordance with the invention. Thus in use of the invention, a short wearer might need no rings whereas a tall wearer might utilize one large ring or several smaller rings. In other respects, however, the torso sections are identical for any size wearer.

A further feature of the invention is the facility with which the sections and the rings may be assembled together. Thus, the upper torso covering is formed with a coupler which fits over the corresponding coupler of the lower torso covering section when no rings are required. The sizing rings have upper and lower couplers which accommodate the complementary couplers of the torso sections, or of other rings. Seal means is provided to seal the rings to the mating coupler so the hermetic seal of torso portion will be maintained. In order to secure the members together, matching grooves are formed in facing surfaces into which a flexible cable or wire may be inserted to hold the parts assembled.

In prior space suits, where there were plural torso sections, entry of the wearer into the suit was accomplished by separating the torso covering and then donning the two portions much in the same manner as one would don ordinary clothing (such as trousers and a pull-over sweater). In accordance with the present invention, once the torso covering has been assembled, it is not intended that it be disassembled. The back of the torso of the space suit is formed with a large opening which is closed off by the backpack containing life-support, communication and other facilities for the astronaut. In the present invention, the forward frame of the backpack is hinged to the torso adjacent the opening in the back thereof. To provide ingress to the space suit, the backpack is unlatched and swung open (or totally removed). After the wearer is inside the suit, the backpack is closed and latched.

Because almost the entire back of the upper torso covering section is formed with the opening heretofore described, the separation between the upper and lower torso sections is slanted rather than being horizontal. Thus, the coupler of the upper torso section is located immediately beneath the opening in the back of the upper torso section and slants upwardly-forwardly. All of the rings and the coupler of the lower torso section slant parallel to the coupler of the upper torso section. This arrangement permits the back opening of the torso portion to be ample for ingress and egress of the largest wearer to utilize the suit.

SUMMARY OF THE INVENTION

The foregoing and other objects and advantages of the invention are achieved by dividing the torso covering into upper and lower portions having mating slanted couplers which extend from the lower edge of opening in the back of the torso section upwardly-forwardly. In order to accommodate larger wearers, sizing rings are provided having couplers which interfit the couplers on the upper and lower sections. Several sizing rings may be used, depending upon the torso length of the wearer.

IN THE DRAWINGS

DESCRIPTION OF PREFERRED EMBODIMENT

Figure 1:
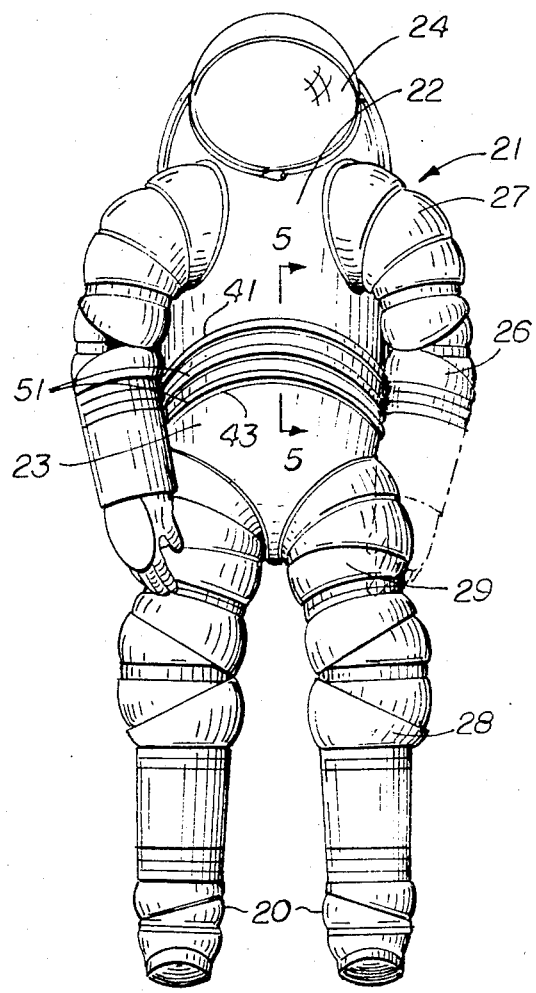
FIG. 1 is a front elevational view of a space suit in which the present invention is incorporated.

Space suit 21 is formed with an upper torso covering 22 and a lower torso covering 23. The top of upper covering 22 is closed off by a helmet 24. Extending from either side of covering 22 are shoulder joints 27 to which are attached the arm coverings 26. At the bottom of the lower torso covering 23 are hip joints 29 to which are attached the leg coverings 28. The shoulder and hip joints are described in considerable detail in copending application titled, "Shoulder and Hip Joint for Hard Space Suits and the Like," Ser. No. 684,192; filed Dec. 20, 1984 The elbow and knee joints are fully described in copending application titled, "Elbow and Knee Joint for Hard Space Suits and the Like," Ser. No. 684,190; filed Dec. 20, 1984. Lower leg joints 20 are similar to the three-bearing articulated joints disclosed in U.S. Pat. No. 3,405,405.

Figure 2:
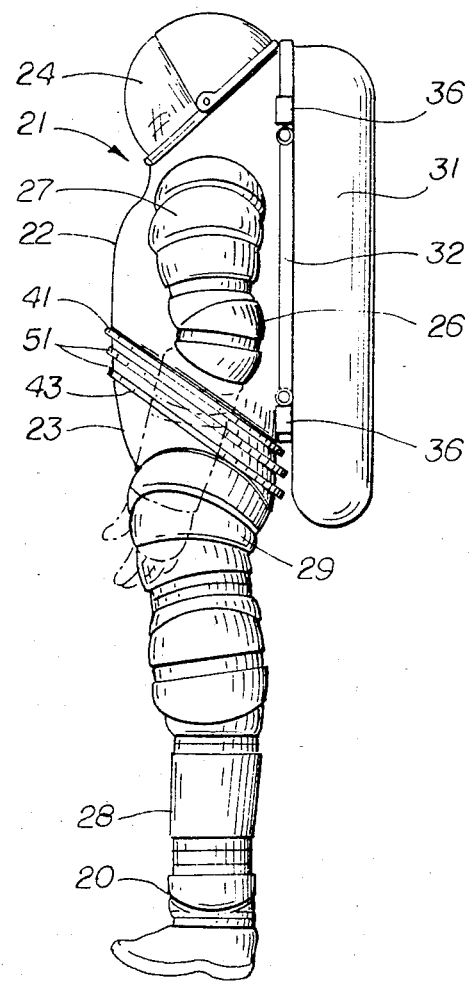
FIG. 2 is a side elevational view thereof.

Each suit 21 is provided with a backpack 31 carrying life support and other equipment. A forward frame 32 (FIGS. 2 and 3) is located at the front of the pack 31. The upper torso covering 22 is provided with a frame 33 which engages frame 32 and surrounds an opening 34 in the upper torso covering 22. Frame 32 may be attached to frame 33 by means of hinges 36 and the pack may be held in closed position by latch 37. Latch 37 has a pivotable control lever 38 and slidable pins 39 which are partially contained in guides 40. When lever 38 is pushed in a downward and backward direction (clockwise) pins 39 are moved outwardly from guides 40 so that they may engage sockets 30. When pack 31 is rotated 90 degrees or more from frame 33 (or if the hinges 36 are capable of being disassembled, totally removed) the astronaut may enter or leave the suit 21 through the opening 34.

Figure 3:
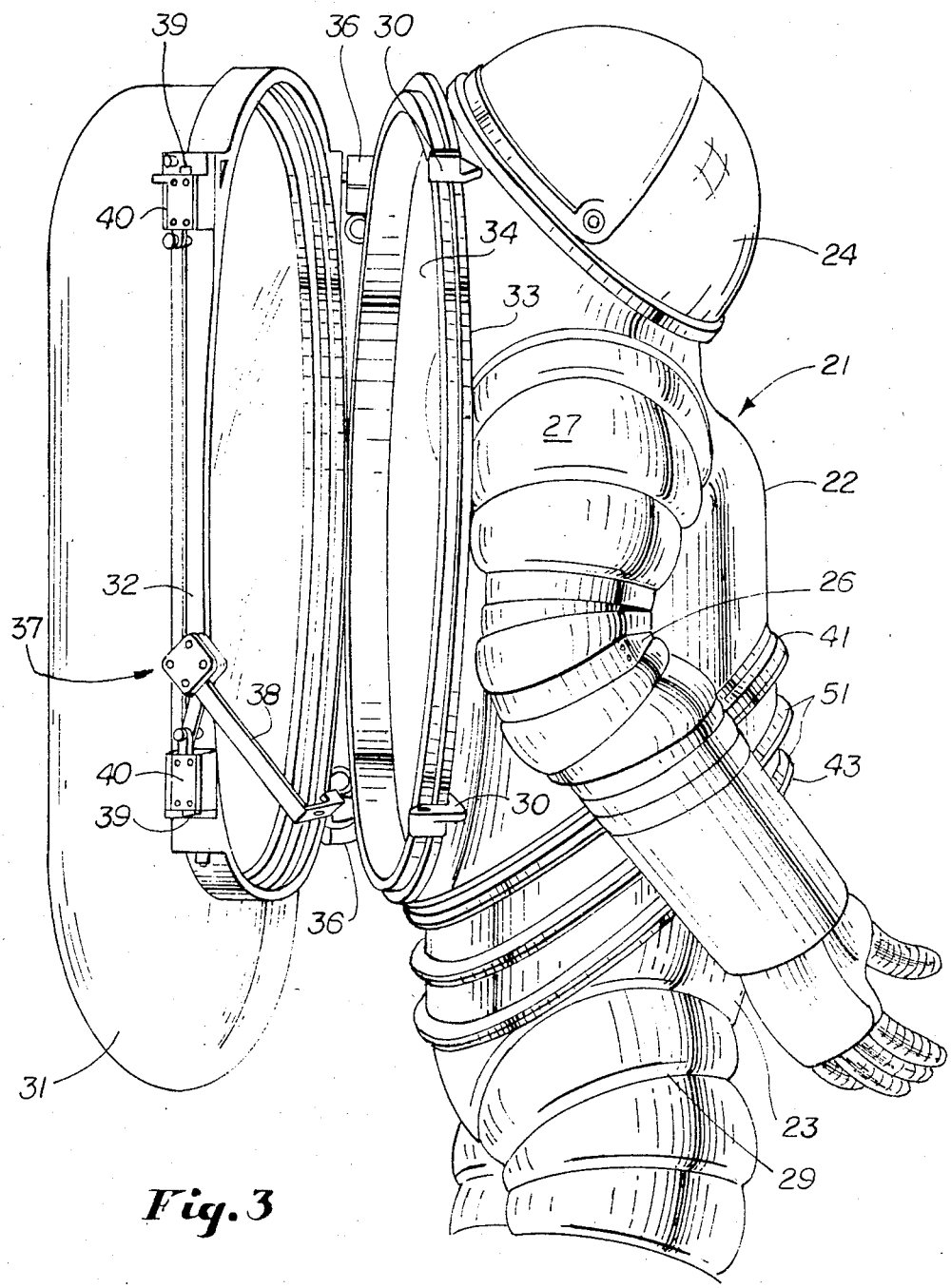
FIG. 3 is a perspective view partially from the rear and partially from the right side with the backpack unlatched and slightly opened.
Figure 4:
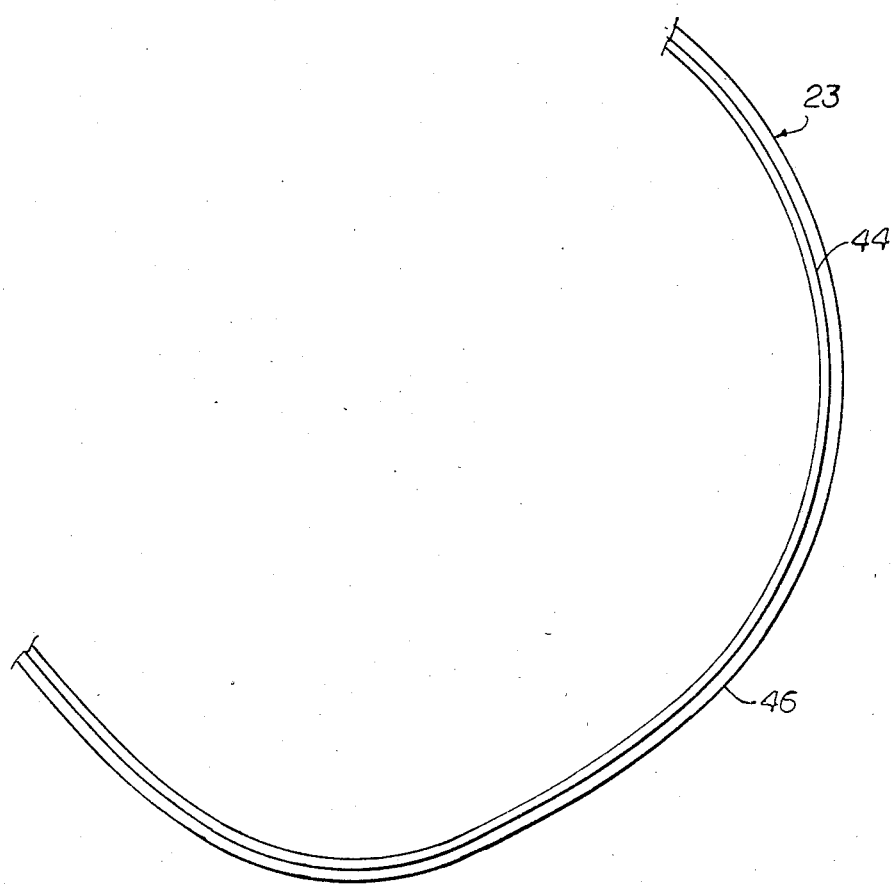
FIG. 4 is a partial view looking downwardly and forwardly on the top of lower torso section 23 along line 4—4 in FIG. 6.

On the lower edge of covering 22 is upper torso coupler 41 (FIGS. 1, 5 and 6) which slants upwardly-forwardly from the bottom edge of frame 33 (FIG. 3). In one embodiment of the invention the slant angle between a vertical axis and the coupler 41 was 50 degrees. Coupler 41 is formed with a collar 42. Lower torso coupler 43 is fixed to the upper edge of lower covering 23, and in the assembled condition of the suit 21 in parallel to coupler 41. Coupler 43 has a collar 44 dimensioned to fit inside collar 42 and is formed with an external peripheral flange 46 which serves as a stop.

To accommodate larger astronauts, one or more sizing rings 51 are used. Ring 51 has an upper coupler collar 52 dimensioned to fit inside collar 42 and a shoulder 53 serving as a stop limiting the movement of collars 42 and 52 relative to each other. Thus, couplers 52 and 43 are substantially identical. Below shoulder 53 is a vertically-oriented wall portion 54 terminating in an inward-extending shoulder 56 below which is a lower coupler collar 57 substantially identical with the coupler 41.

Figure 5:
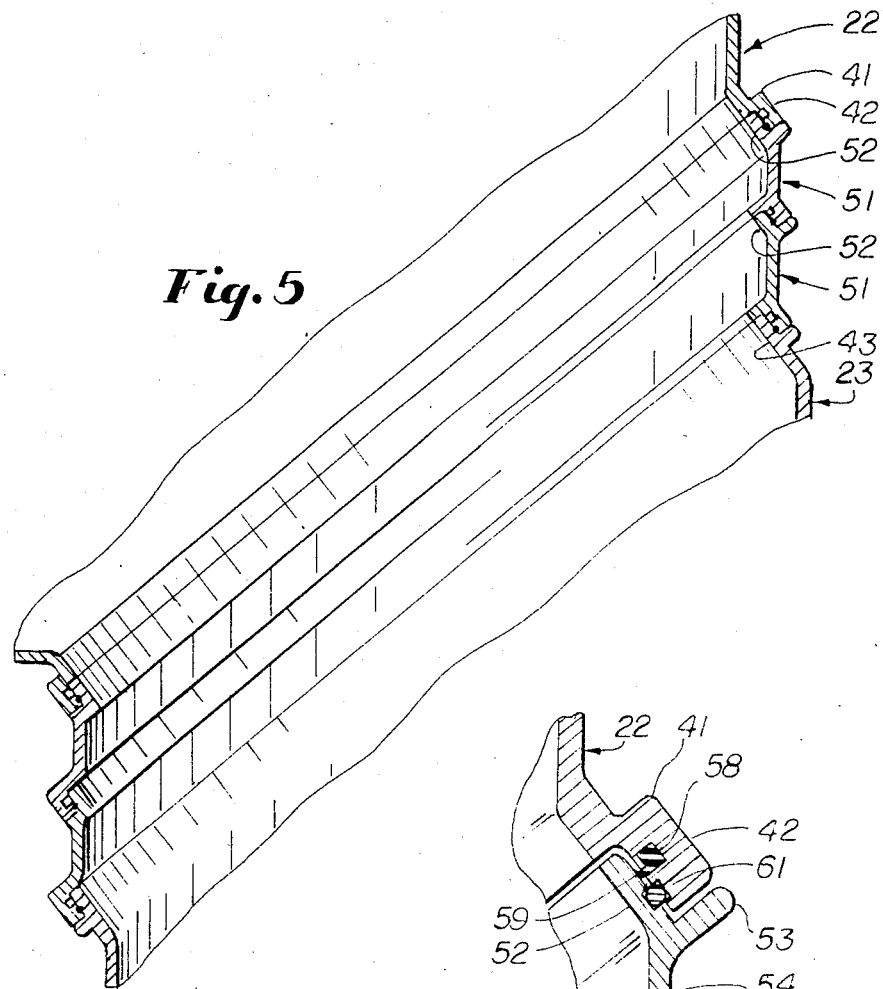
FIG. 5 is a sectional view taken substantially along the line 5—5 of FIG. 1.
Figure 6:
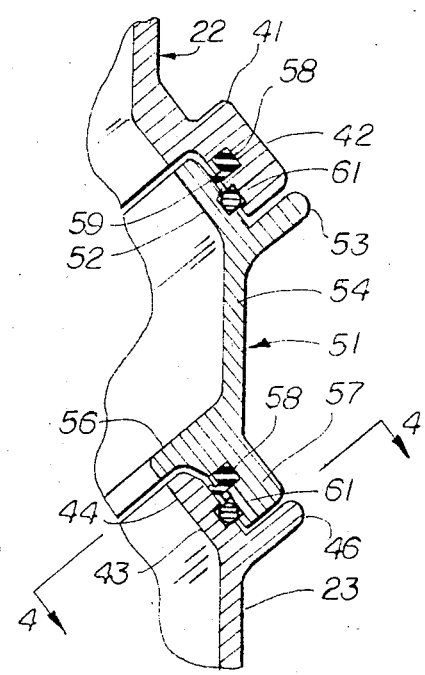
FIG. 6 is an enlarged fragmentary sectional view through one sizing ring and its mating couplers.

To effect a hermetic seal between the mating parts, each lower collar is formed with a groove to receive an elastomeric seal 58 having a blade 59 which seals against the mating member. One means of holding the parts assembled is the provision of matching grooves in opposed surfaces into which slides a flexible cable or wire 61 via a slot in the coupler collar (not shown). So long as the cable 61 is in place, the parts are held assembled. A suitable slot and convenient means for inserting and withdrawing the cable are shown in co-pending application Ser. No 642,602; filed Aug. 20, 1984. Although only two sizing rings are shown in FIG. 5 and they are of equal height, it is to be understood that more rings may be inserted between couplers 41 and 43 and the rings may have different heights. The two rings 51 in FIG. 5 may of course be replaced with a single ring that is as high as two rings 51.

What is claimed is:

1. A space suit comprising an upper torso section, a lower torso section, a helmet and arm coverings attached to said upper torso section, leg coverings attached to said lower torso section,
    the back of said upper torso section being formed with an opening sufficient to provide ingress and egress of the wearer, means hinged to said upper torso section for closing said opening,
    a first coupler on the lower edge of said upper torso section formed with a first collar,
    a second coupler on the upper edge of said lower torso section formed with a second collar dimensioned to interfit with said first collar,
    seal means forming a hermetic seal between said sections, and
    an astronaut's backpack attached to said closure means.

2. An apparatus for joining together the rigid upper and lower sections of the torso portion of a hard space suit and altering the length of said torso portion, said apparatus comprising,
    a first coupler formed with a first collar, said coupler being adapted to be affixed to the lower edge of said upper torso section,
    a second coupler having a second collar and a contiguous flange, said second coupler being adapted to be affixed to the upper edge of said lower torso section,
    a sizing ring having a third collar and a contiguous shoulder formed on a first end of said sizing ring, said third collar being dimensioned to fit within said first collar,
    means for detachably securing said first collar to said third collar, said securing means being substantially coextensive with the girth of said collars,
    means for forming a hermetic seal between said first and third collars,
    said shoulder stopping movement between said first and third collars, said sizing ring having a fourth collar and a contiguous second shoulder formed on a second end, said fourth collar being dimensioned to fit around said second collar, means for detachably securing said second collar to said fourth collar, said securing means being substantially coextensive with the girth of said collars, means for forming a hermetic seal between said second and fourth collars, and said flange and said second shoulder stopping movement between said second and fourth collars.

3. An apparatus as set forth in claim 2 wherein said first securing means includes a first cable and facing grooves in said first and third collars for receiving said first cable, and said second securing means includes a second cable and facing grooves in said second and fourth collars for receiving said second cable.

4. An apparatus as set forth in claim 2 in which a plurality of sizing rings are serially and detachably secured between said first and second couplers.

5. An apparatus as described in claim 2 wherein said sizing ring and collars are oblong and said sizing ring and collars slant upwardly and forwardly from the back of said torso portion.

6. A hard space suit comprising, a rigid torso covering including an upper section and a lower section, a helmet and arm coverings attached to said upper torso section, leg coverings attached to said lower torso section, the back of said upper torso section being formed with an opening sufficient to provide ingress and egress of the wearer, means for closing said opening, means for detachably fastening said upper torso section to said lower torso section so as to prevent relative motion between said upper and lower torso sections and to alter the length of said torso section, said fastening means comprising, a first coupler formed with a first collar and affixed to the lower end of said upper torso section, a second coupler with a second collar and a contiguous flange affixed to the upper end of said lower torso section, a sizing ring having a third collar and a contiguous shoulder formed on a first end of said sizing ring, said third collar being dimensioned to fit within said first collar, means for detachably securing said first collar to said third collar, said securing means being substantially coextensive with the girth of said first and third collars, means for forming a hermetic seal between said first and third collars, said shoulder stopping movement between said first and third collars, said sizing ring having a fourth collar and a contiguous second shoulder formed on a second end, said fourth collar being dimensioned to fit around said second collar, means for detachably securing said second collar to said fourth collar, said second securing means being substantially coextensive with the girth of said second and fourth collars, means for forming a hermetic seal between said second and fourth collars, and said flange and said second shoulder stopping movement between said second and fourth collars.

7. A hard space suit as described in claim 6 wherein a plurality of sizing rings are serially and detachably secured between said first and second couplers.

8. A hard space suit as set forth in claim 6 wherein said closing means is hinged to said upper torso section and includes a backpack.

9. A hard space suit as described in claim 6 in which said first securing means includes a first cable and facing grooves in said first and third collars for receiving said first cable, and said second securing means includes a second cable and facing grooves in said second and fourth collars for receiving said second cable.

10. A hard space suit as set forth in claim 6 wherein said sizing ring and collars slant upwardly and forwardly from the back of said torso portion.

* * * * *